(No Model.)
D. MURLLESS.
RUBBER DAM CLAMP.
No. 576,142. Patented Feb. 2, 1897.
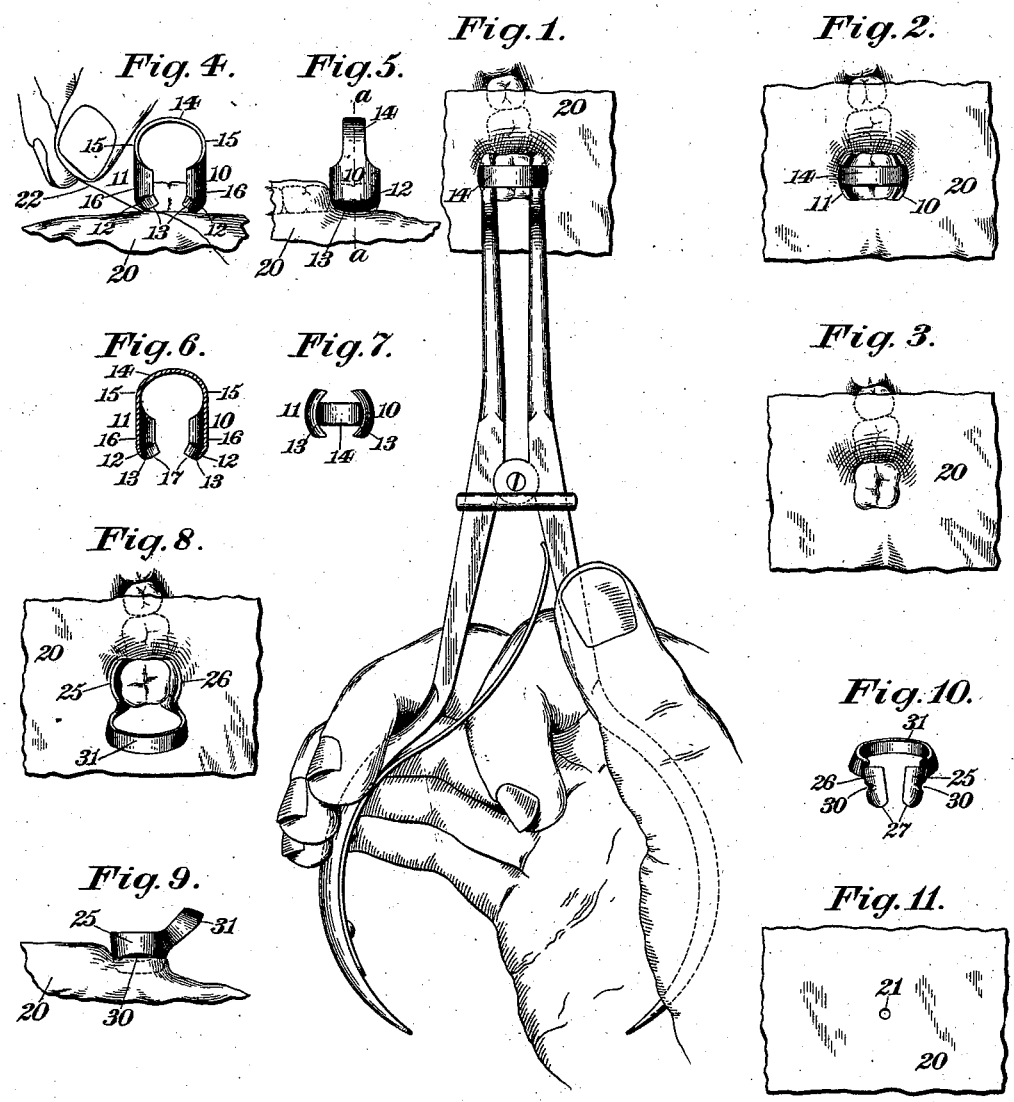
Witnesses:
F. L. Edwards Jr.
Fred. J. Dole.
Inventor:
Daniel Murlless.
By his Attorney,
F. A. Richards.

UNITED STATES PATENT OFFICE.

DANIEL MURLLESS, OF HOLYOKE, MASSACHUSETTS.

RUBBER-DAM CLAMP.

SPECIFICATION forming part of Letters Patent No. 576,142, dated February 2, 1897.

Application filed June 19, 1896. Serial No. 596,163. (No model.)

*To all whom it may concern:*

Be it known that I, DANIEL MURLLESS, a citizen of the United States, residing in Holyoke, in the county of Hampden and State of Massachusetts, have invented certain new and useful Improvements in Rubber-Dam Clamps, of which the following is a specification.

This invention relates to clamps more particularly known as "dentists'" clamps, and more especially designated as "rubber-dam" clamps; and the object of the invention is to provide a device of this character whereby the rubber dam can be quickly and easily placed in position and can be used by making only a small aperture therethrough, and whereby also the device will not tear nor enlarge the aperture in the rubber dam while it is being placed in position.

In the drawings accompanying and forming part of this specification, Figure 1 is a view showing one form of this rubber-dam clamp, being secured in position on a tooth by the usual forceps. Fig. 2 is a top view thereof in position on a tooth. Fig. 3 is a view with the clamp removed and the rubber dam in position on a tooth. Fig. 4 is a view of one form of this clamp, showing the same holding the rubber dam on a tooth to enable the operator to secure it in position by the usual thread. Fig. 5 is a view at right angles to that shown in Fig. 4. Fig. 6 is a transverse sectional view taken in line *a a*, Fig. 5. Fig. 7 is an under side view of this form of clamp. Fig. 8 is a top view of another form of clamp holding a rubber dam in position on a tooth. Fig. 9 is a side view thereof. Fig. 10 is also a side view thereof at right angles to the view shown in Fig. 9; and Fig. 11 is a view of a rubber dam, showing the size of aperture necessary in order to use the same in connection with this particular construction of clamp.

Similar characters designate like parts in all the figures of the drawings.

In practice it has not only been found extremely disadvantageous to place the rubber dam around a tooth in the usual manner, but it has also been found necessary to make a relatively large aperture or perforation in the rubber in order to stretch the same around the tooth, so that the rubber dam oftentimes affords no protection to prevent spittle or other moisture reaching the cavity. In order, therefore, to overcome these serious disadvantages, I have provided an improved clamp whereby the rubber dam can be inserted in position on the clamp before the same is placed on a tooth or the clamp inserted and the dam stretched over the same and guided thereby into its proper position, and which is a comparatively easy matter as compared with the insertion of a rubber dam directly around the tooth in the usual way, and whereby also the necessity of forming a large hole in the rubber dam is obviated.

In the preferred form thereof herein shown and described this rubber-dam clamp in one construction thereof comprises two inwardly-curved, substantially semicylindrical, or concavo-convex members 10 and 11, having inwardly-bent or curved concavo-convex lower edges, thereby forming beveled exterior faces 12 and two clamping edges or jaws 13, adapted to engage a tooth. The members 10 and 11 have their upper portions cut away or tapered inwardly and preferably connected by a substantially semicircular member or spring 14, which in the construction shown has its outer side faces 15 in alinement with the outer side faces 16 of the concavo-convex members 10 and 11, whereby the diameter of the spring member 14 will be the same as the major portion of such curved members 10 and 11, and therefore no impediment is formed to prevent the stretching of the rubber dam over the clamp.

In this construction of clamp the concavo-convex clamping edges or jaws 13 are curved transversely or formed substantially semicircular, whereby they taper from their outer edges to their centers, as at 17, for the purpose hereinafter set forth. In the use of this form of clamp a perforation 21, about one-sixteenth of an inch in diameter, is made in the rubber dam 20, and the same is then stretched over the spring-connecting member 14 and forced down over the sides of the members 10 and 11 until it is in position at the juncture of the sides 16 and the jaws 13 of such members. The forceps are then inserted intermediate of the members 10 and 11 and the same spread and placed in position to permit the jaws 13 to engage the tooth, whereby said members will be parallel and close to the tooth, and whereupon, owing to the inwardly-bent and bevel-edged jaws, the rubber can be easily pushed down and guided in position closely to engage the tooth, and, owing also to the semicircular or transversely-curved under biting edges 13 of the jaws, the rubber will contract under such edges, Fig. 4, and thus be held in position by the clamp for the reception of a thread 22 in order to secure the rubber dam in position, after which the clamp can be removed. This form of clamp is preferably used for work requiring a comparatively short time. It will be understood, however, that instead of placing the dam on the clamp before the latter is placed on the tooth the clamp may first be placed on the tooth and the rubber dam then forced over the clamp and around the tooth, the construction of the clamp permitting the same to act as a guide for this purpose. When, however, the operator has a comparatively long or tedious operation and it is desired to retain the rubber in position continuously by means of a clamp, I have provided another form thereof, which in the construction shown in Figs. 8, 9, and 10 also comprises two inwardly-curved substantially semicylindrical or concavo-convex members 25 and 26, connected together to flare outward at their upper edges and having inwardly bent or curved concavo-convex lower edges, forming two clamping-jaws 27 for engaging the tooth. Each of these curved members 25 and 26 is shown provided on its outer face with a recess or groove 30 for the purpose hereinafter specified. These members, in the construction shown, are connected at their upper portions by a spring member 31, herein shown extending rearwardly and upwardly therefrom, whereby such connecting member 31 will be out of the way of the top of the tooth when the clamp is in position thereon, so that the tooth can be operated on without removing the clamp.

In the use of this form of clamp a suitable perforation 21, also about one-sixteenth of an inch in diameter, having been made in the rubber dam the same is stretched over the under edges of the clamp until the edge of said perforation rests in the groove 30 in the outer face of the clamp members. The forceps are then inserted between the arms of the spring and the members 25 and 26 spread and placed in position to grasp the tooth, whereby the rubber dam will be held firmly around the tooth without the use of a thread in a manner that will be obvious without further description.

In this construction of clamp the spring-connecting member 31 is out of the way of the cavity of the tooth, and owing to the flaring construction of the members 25 and 26 the clamp, to a certain extent, is also out of the way of the upper sides of the tooth, so that the same can be operated on while the clamp remains in position.

By these improved constructions of clamps it will be seen that the rubber dam can be slipped on and from the same quickly and easily without the necessity of making a large hole or splitting or tearing the rubber or other material usually employed as the dam.

Having described my invention, I claim—

1. A clamp comprising two substantially semicylindrical members connected together by a member having its outer faces in alinement with the outer faces of said semicylindrical members.

2. A clamp comprising two concavo-convex members connected together by a spring member, each of said concavo-convex members having an exterior groove for the reception of a rubber dam.

3. A clamp comprising two curved or substantially semicylindrical members having their lower edges inwardly bent or curved to form clamping-jaws and also having such lower edges transversely curved and exteriorly beveled, and a spring member connecting said curved members and having its outer side faces in alinement with the outer side faces of the curved members.

DANIEL MURLLESS.

Witnesses:
 EDWARD W. CHAPIN,
 CHARLES SOULS MURLLESS.